(12) United States Patent
Fresquet (10) Patent No.: US 9,151,941 B2
(45) Date of Patent: Oct. 6, 2015

(54) OPTICAL DEVICE AND METHOD FOR INSPECTING STRUCTURED OBJECTS

(75) Inventor: Gilles Fresquet, Garrigues Sainte Eulalie (FR)

(73) Assignee: Nanotec Solution, Nîmes (FR)

( * ) Notice: Subject to any disclaimer, the term of this patent is extended or adjusted under 35 U.S.C. 154(b) by 0 days.

(21) Appl. No.: 13/643,435

(22) PCT Filed: Apr. 19, 2011

(86) PCT No.: PCT/FR2011/050900
§ 371 (c)(1),
(2), (4) Date: Oct. 25, 2012

(87) PCT Pub. No.: WO2011/135231
PCT Pub. Date: Nov. 3, 2011

(65) Prior Publication Data
US 2013/0038863 A1 Feb. 14, 2013

(30) Foreign Application Priority Data
Apr. 26, 2010 (FR) ...................... 10 53173

(51) Int. Cl.
*G01N 21/01* (2006.01)
*G02B 21/00* (2006.01)
(Continued)

(52) U.S. Cl.
CPC .......... *G02B 21/0016* (2013.01); *G01B 9/0209* (2013.01); *G01B 9/02057* (2013.01); *G01B 9/04* (2013.01); *G01B 11/0675* (2013.01); *G01B 11/2441* (2013.01)

(58) Field of Classification Search
CPC .......... G01B 11/0675; G01B 11/2441; G01B 9/02007; G01B 9/0209; G01B 9/02057; G01B 9/04; G01B 11/02; G01B 11/0625; G01B 11/14; G01B 11/22; G01B 9/02; G01B 9/02098; G01B 9/02091; G01B 11/06; G01B 11/24; G01B 21/0016; G01B 11/0608; A61B 5/0066; A61B 5/0073; A61B 3/102; G01N 21/4795; G01N 2021/1787; G02B 21/0016
USPC ............. 356/72, 73, 497, 511–516, 479, 450; 250/332, 338.1–353
See application file for complete search history.

(56) References Cited

U.S. PATENT DOCUMENTS 4,627,731 A * 12/1986 Waters et al. .................. 356/479
4,755,668 A * 7/1988 Davis ........................ 250/227.27
(Continued)

FOREIGN PATENT DOCUMENTS

JP 6154228 6/1994

*Primary Examiner* — Michael A Lyons
*Assistant Examiner* — Violeta A Prieto
(74) *Attorney, Agent, or Firm* — Greer, Burns & Crain, Ltd.

(57) ABSTRACT

A microscope device for inspecting structured objects, including: a camera; an optical imager capable of producing, on the camera, an image of the object according to a field of view, and including a distal lens arranged on the side of the object; and a low-coherence infrared interferometer including a measurement beam capable of producing measurements by means of interferences between retroreflections of the measurement beam and at least one separate optical reference. The device also includes coupler for injecting the measurement beam into the optical imaging means in such a way that the beam passes through the distal lens, and the low-coherence infrared interferometer is balanced in such a way that only the measurement beam retroreflections, taking place at optical distances close to the optical distance covered by the beam to the object, produce measurements.

18 Claims, 3 Drawing Sheets

(51) Int. Cl.
  *G01B 9/04*   (2006.01)
  *G01B 11/06*  (2006.01)
  *G01B 11/24*  (2006.01)
  *G01B 9/02*   (2006.01)

(56) References Cited

U.S. PATENT DOCUMENTS

| | | | | |
|---|---|---|---|---|
| 4,873,989 A | * | 10/1989 | Einzig | 600/505 |
| 5,187,546 A | * | 2/1993 | Johnston | 356/499 |
| 5,648,849 A | | 7/1997 | Canteloup et al. | |
| 6,134,003 A | * | 10/2000 | Tearney et al. | 356/479 |
| 6,496,265 B1 | * | 12/2002 | Duncan et al. | 356/479 |
| 6,501,551 B1 | * | 12/2002 | Tearney et al. | 356/477 |
| 6,897,964 B2 | * | 5/2005 | Takahashi et al. | 356/503 |
| 7,034,271 B1 | | 4/2006 | Sinclair et al. | |
| 7,450,243 B2 | * | 11/2008 | Marks et al. | 356/479 |
| 7,636,167 B2 | * | 12/2009 | Laguarta Bertran et al. | 356/511 |
| 7,782,468 B2 | | 8/2010 | Courteville | |
| 2005/0158889 A1 | * | 7/2005 | Brouillette et al. | 438/16 |
| 2005/0190374 A1 | * | 9/2005 | Chan et al. | 356/497 |
| 2007/0002331 A1 | * | 1/2007 | Hall | 356/503 |
| 2007/0013918 A1 | * | 1/2007 | Hauger et al. | 356/512 |
| 2008/0007733 A1 | * | 1/2008 | Marks et al. | 356/477 |
| 2008/0062429 A1 | | 3/2008 | Liang et al. | |
| 2009/0182528 A1 | * | 7/2009 | De Groot et al. | 702/167 |
| 2009/0262333 A1 | * | 10/2009 | Hall | 356/51 |
| 2009/0303495 A1 | * | 12/2009 | Courteville | 356/625 |

* cited by examiner

OPTICAL DEVICE AND METHOD FOR INSPECTING STRUCTURED OBJECTS

TECHNICAL FIELD

The present invention relates to a device for three-dimensionally inspecting structured objects. It is also directed to a method for inspecting structured objects implemented in this device.

The field of the invention is more particularly, but not limited to, that of measurement and dimensional control of devices in the field of microsystems (MEMs) and in microelectronics.

BACKGROUND

Manufacturing techniques in microelectronics and in microsystems (MEMs, MOEMs) progress in particular towards making complex volume structures, capable of better volume integration of functions of these systems.

The development of these techniques generates a change in needs for measurement and dimensional control means, exactly to give greater consideration to this volume aspect.

Optical measurement techniques, in particular based on imaging and interferometry, are widely used because they can be integrated in industrial environments and they can provide accurate information in measurement ranges from a few millimeters to less than one nanometer. They also have the advantage to allow measurements without contact, without degradation nor preparation of the samples, with devices that remain affordable.

It is known in particular imaging techniques based on conventional microscopy, usually in reflection, which enable surfaces and patterns to be inspected and dimensional measurements to be performed by image analysis in a plane substantially perpendicular to the observation axis. These devices usually comprise a light source, a camera and an imaging optics with a suited magnification. Their lateral resolution, in the order of one micrometer, is essentially determined by the optical diffraction phenomenon, the magnification and the quality of optics. The measurements are usually made in the visible or near ultraviolet part of the light spectrum, which enables diffraction to be restricted, and cameras and optics at a reasonable cost to be used.

For the purpose of obtaining depth quantitative measurements (parallel to the observation axis), the imaging microscopy can be complemented by interferential measurements, according to interferometric microscopy techniques. The device is then complemented by an interferometer which enables light from the surface of the object to be measured (the measurement wave) and a reference light wave from the same source and reflected by a reference surface to be superimposed on the camera. Interferences are thus obtained between the measurement and reference waves which enable the topology of the surface to be measured with a depth resolution in the order of one nanometer. For implementation reasons similar to the case of imaging microscopy, measurements are usually made in the visible part of the light spectrum.

The interferometric microscopy enables, for example, topography measurements on a first surface, or thickness measurements of thin layers substantially transparent to the wavelengths used, to be effectively made. On the other hand, it can hardly make thickness measurements of materials higher than a few tens of microns without optical compensations delicate to implement, and of course it does not enable silicon thicknesses to be measured, given that this material is not transparent to visible wavelengths.

The issue in measuring thicknesses is effectively solved by interferometric measurement techniques, in particular based on low-coherence infrared interferometry. Indeed, a number of materials widely used in microelectronics and in microsystems such as silicon or gallium arsenide are substantially transparent for wavelengths in near infrared. These are generally point measurement systems, namely capable of measuring one or more heights or thicknesses (in the case of measurements on stacks of layers) at a point of the surface of the object.

Another issue in microsystems and in microelectronics is the measurement of heights of patterns having a high depth to width ratio (also called "aspect ratio"). These patterns, made in particular by deep plasma etching ("Deep RIE") can have, for example, the form of trenches or holes a few micrometers wide and a few tens of micrometers deep. The measurement of their depth is particularly difficult exactly because of the aspect ratio. All the techniques based on an optical measurement beam which has a high numerical aperture, which includes imaging based techniques, whether interferometric or not, and confocal techniques, are inoperative because the beam cannot reach the bottom of the structures under usable conditions.

Document FR 2 892 188 to Courteville describes a method and a device capable of measuring the height of patterns which have a high aspect ratio. The device includes a substantially punctual measurement beam, which covers a restricted region on the surface of the object. The height measurement of patterns covered by the beam is obtained by dividing the incident wave front between the high and low parts of patterns and interferometrically measuring phase shifts induced between these fractions of wave fronts after a modal filtering step. The device described in FR 2 892 188 can advantageously be implemented at infrared wavelengths to simultaneously measure thicknesses of layers of semiconductor materials.

Characterizing elements in microelectronics or in microsystems often requires simultaneously topology measurements and height or thickness measurements performed in particular places. Locating these height or thickness measurements should sometimes be very accurate, for example in "chip level packaging" applications where apertures or vias a few micrometers wide spaced apart by several tens or hundreds of micrometers are pierced through the semi-conductor substrate. In other cases, height and thickness measurements should be performed in a region having a restricted range to take only some patterns into account. In all cases, the infrared measurement beam should thus be accurately adjusted in position and/or magnification on the surface of the object.

Document FR 2 718 231 to Canteloup et al. is known which describes a height or thickness measurement method using a point measurement beam the position of which is viewed on a camera. The measurement beam passes through the imaging optics of the camera such as to appear in the field being viewed. This device enables the measurement beam to be accurately positioned on the surface of the object. However, the wavelength of the interferometric measurement is in this case included in imaging wavelengths for which the imaging optics is optimized. This is a strong constraint in the implementation described in FR 2 718 231, related in particular to the fact that interferometric measurement techniques are mostly very sensitive to parasitic reflections, multiple optical paths and other aberrations of wave fronts which inevitably appear when an optics is not optimized for the operating wavelength. In particular, the method described in FR 2 718 231 is unsuitable for an interferometric measurement system in the infrared.

The purpose of the present invention is to provide a device for inspecting structured objects, capable of simultaneously producing topography measurements, layer thickness and pattern height measurements.

SUMMARY

This purpose is achieved with a microscope device for inspecting structured objects, including:
 a camera,
 optical imaging means capable of producing, on the camera, an image of the object according to a field of view, which optical imaging means include a distal lens arranged on the side of the object, and
 a low-coherence infrared interferometer, including a measurement beam with a plurality of infrared wavelengths, capable of producing measurements by means of interferences between retroreflections of said measurement beam and at least one separate optical reference,
 characterised in that:
 it further includes coupling means for injecting the measurement beam into the optical imaging means in such a way that it passes through the distal lens, and that it intercepts said object according to a measurement region substantially included in the field of view of the imaging means, and
 the low-coherence infrared interferometer is balanced in such a way that only the measurement beam retroreflections, taking place at optical distances close to the optical distance covered by said beam to the object, defining a measurement range, produce measurements.

The distal lens can be designed to produce images at visible wavelengths. It can include a microscope lens.

The imaging system of the device according to the invention can thus include components conventionally used in microscopy, which has substantial advantages in terms of costs and industrial development. The camera can be a CCD camera.

The device according to the invention can produce an image of the object at an optical wavelength or in a plurality of optical wavelengths substantially included in a range of 200 to 1100 nanometers, that is in the near ultraviolet (about 200 to 400 nm), visible (about 400 to 780 nm) and/or near infrared (about 780 to 1100 nm).

The low-coherence infrared interferometer can produce, in a non-limiting way, dimensional measurements performed along axes substantially parallel to the optical axis of the imaging system, such as for example, layer thickness or height measurements. Thanks to the use of infrared wavelengths, these measurements can be performed through materials which are not transparent to the visible wavelengths such as silicon and gallium arsenide.

The measurement beam of the low-coherence infrared interferometer can include wavelengths between 1100 and 1700 nanometers. It can include in particular wavelengths located in the vicinity of 1310 nm (nanometers) and/or 1550 nm.

The device according to the invention thus enables, simultaneously:
 a sample or object to be viewed, imaged and measured by means of an imaging system such as a microscope,
 and measurements to be performed in accurately identified regions of the object with the infrared interferometer.

According to the particularly advantageous characteristics of the invention, measurements with the infrared interferometer are performed through the distal part of the imaging optics, which enables all the measurements to be actually integrated.

This configuration raises a particular difficulty because interferometers are generally very sensitive to parasitic reflections undergone by the measurement beam, which quickly degrade characteristics of measured phases. This is why generally they are implemented separately from imaging systems, or in any case with optics optimized for their working wavelength, in particular with respect to antireflection coatings.

This problem is solved with the device according to the invention by implementing interferometers which enable a "coherence window" substantially corresponding to the measurement range, to be defined. In this way, only the retroreflections of the measurement beam, that is the reflections going back into the interferometer which occur at predetermined optical distances corresponding to the measurement range, substantially contribute to the interference phenomenon. The optical distance is the distance "seen" by light, and corresponds in a medium having a refractive index n to the geometric distance multiplied by the index n. Thus, the measurement is practically not affected by disturbances undergone by the measurement beam in the imaging optics.

The device according to the invention can further include first magnifying means for changing the magnification of the optical imaging means so as to simultaneously modify the field of view and the dimension of the measurement region in substantially identical proportions.

These first magnifying means can be optical elements through which the imaging beam and the measurement beam simultaneously pass. They enable the region observed (the field of view) and the measurement region covered by the measurement beam at the surface of the object to be simultaneously adjusted, so as to adapt them to the characteristic dimensions of the patterns of the object to be measured.

These first magnifying means can include at least one element from:
 a turret equipped with optics having different magnifications, such as microscope lenses, and
 a variable magnification optics, such as a zoom with floating lenses or replaceable lenses.

The device according to the invention can further include second magnifying means enabling the magnification of the measurement beam to be modified, so as to modify the dimension of the measurement region relative to the field of view.

These second magnifying means, which can be optical elements through which only the measurement beam passes, enable to provide the device with a further degree of freedom for setting the dimension of the measurement region.

The device according to the invention can further include relative displacement means of the object and the optical imaging means, enabling the field of view to be positioned at the desired place on the object.

The device according to the invention can also include relative displacement means of the object and the measurement beam, that is enabling the measurement region to be moved in the field of view.

The device according to the invention can further include lighting means, producing a lighting beam with visible wavelengths, arranged so as to illuminate the object through the distal lens. This configuration corresponds to a conventional reflection microscopy configuration.

According to one embodiment, the device according to the invention can further include, at the distal lens, a full field interferometer capable of producing interference fringes superimposed with the image of the object on the camera, so as to deduce therefrom a topography of the surface of the object.

There are different well-known ways to make such full field interferometers, such as Michelson, Mirau, Linnik interferometers, etc. Their principle consists in sampling part of the lighting beam, reflecting it onto a reference surface and superimposing it to the light reflected by the object onto the camera. The interference fringes thus produced enable an altitude measurement of the surface of the object to be calculated at each point of the image, and thus its shape in space to be deduced therefrom.

The full field interferometer can include a dichroic element substantially transparent to the wavelengths of the measurement beam. This dichroic element can for example, according to the type of interferometer used, be a mirror, a beam splitter plate or a beam splitter cube. It can be arranged such that the infrared interferometric measurement beam undergoes a minimum of reflections passing through the full field interferometer, which remains fully functional to the relevant wavelengths of the imaging system.

According to this embodiment, the device according to the invention enables profilometry measurements, that is of the three-dimensional shape of the surface of the object and measurements only accessible through infrared interferometry, to be simultaneously performed.

According to one embodiment, the device according to the invention can further include lighting means arranged opposite the object with respect to the imaging means, including a light source with wavelengths higher than one micrometer.

According to this embodiment, the measurements are thus made in transmission. This embodiment is particularly interesting to perform measurements with the infrared interferometer on the back side (that is the substrate) of microelectronic components for example. It is thus possible to view, as light density variations, particularly opaque regions such as metal tracks to position the measurement region of the infrared interferometer accurately with respect to these elements. It is possible to implement this embodiment with cameras the sensor of which is silicon-based, which retain a sufficient sensitivity at wavelengths higher than 1 micrometer for which the silicon substrate of the object becomes transparent.

The low-coherence infrared interferometer implemented in the device according to the invention can, in a non-limiting way, enable to measure at least one of the following elements in the measurement range:
- the optical thickness of at least one layer of material substantially transparent to wavelengths of the measurement beam,
- the optical thickness of layers of a stack of materials substantially transparent to wavelengths of the measurement beam, the refractive indices of which are substantially different between adjacent layers,
- the height of patterns at least a high part of which and at least a low part of which are included in the measurement region, according for example to the method described in FR 2 892 188,
- the absolute height, in the measurement range, of points of contact between the measurement beam and the object,
- the difference in height between points of contact between the measurement beam and the object at different positions on the object.

The low-coherence infrared interferometer implemented in a device according to the invention is also capable of performing measurements of refractive indices, for example by measuring optical thickness of layers of materials the geometrical thicknesses of which could be determined otherwise. This type of measurements can for example enable the nature of a material to be checked.

To view the measurement region in the field of view, the device according to the invention can further include a viewing beam superimposed with the measurement beam, which viewing beam includes at least one wavelength detectable by the camera.

This viewing beam can be adjusted such that it intercepts the surface of the object according to the measurement region, which enables the latter to be directly viewed on the image produced by the camera.

The device according to the invention can further include digital processing and displaying means, capable of producing an image of the field of view including a display of the measurement region.

This display of the measurement region can be generated by software means and superimposed with the image of the surface of the object.

According to another aspect, it is provided a method for inspecting structured objects including:
- producing, on a camera, an image of the object according to a field of view, implementing a distal lens arranged on the side of the object, and
- producing measurements by interferences between retroreflections of a measurement beam and at least one separate optical reference, from a low-coherence infrared interferometer emitting this measurement beam with a plurality of infrared wavelengths, characterised in that:
- it further includes a coupling for inserting the measurement beam into the optical imaging means in such a way that it passes through the distal lens and that it intercepts said object according to a measurement region substantially included in the field of view of the imaging means, and
- the low-coherence infrared interferometer is balanced in such a way that only the measurement beam retroreflections, taking place at optical distances close to the optical distance covered by said beam to the object, defining a measurement range, produce measurements.

Locating the measurement region in the image of the field of view can be stored during a prior calibration, in particular when the position of the measurement beam in the imaging means, therefore in the field of view, is fixed.

DETAILED DESCRIPTION

According to a particularly advantageous aspect of the device according to the invention, information from the camera and the low-coherence infrared interferometer can be combined to produce a three-dimensional representation of the object.

A representation of the object is thus obtained according to additional aspects, which provides information which are very useful and hardly accessible with separate systems. Indeed, it is possible in particular:
- to make layer thickness or pattern height measurements very accurately located with respect to characteristic elements of the object, identified on its surface or by looking through,
- to generate a three-dimensional representation of the object including the shape of the surface and the thickness of underlying layers accurately located with respect to this surface,
- for analysing high aspect ratio (narrow and deep) patterns for which the profilometry alone is inoperative, to complement a three-dimensional representation of the surface obtained by profilometry by the representation of patterns with their actual depth measured by infrared interferometry.

BRIEF DESCRIPTION OF THE DRAWINGS

Further advantages and features of the invention will appear upon reading the detailed description of implementations and embodiments in no way limiting, and the following appended drawings in which:

FIG. 4b illustrates thickness measurements of layers obtained with an inspecting device according to the invention, for a position at the surface of an object illustrated in FIG. 4a, FIG. 5 illustrates height measurements of a pattern obtained with an inspecting device according to the invention, for a position at the surface of an object illustrated in FIG. 5a, and FIG. 5b illustrates height measurements of a pattern obtained with an inspecting device according to the invention, for a position at the surface of the object illustrated in FIG. 5a.

Figure 1:
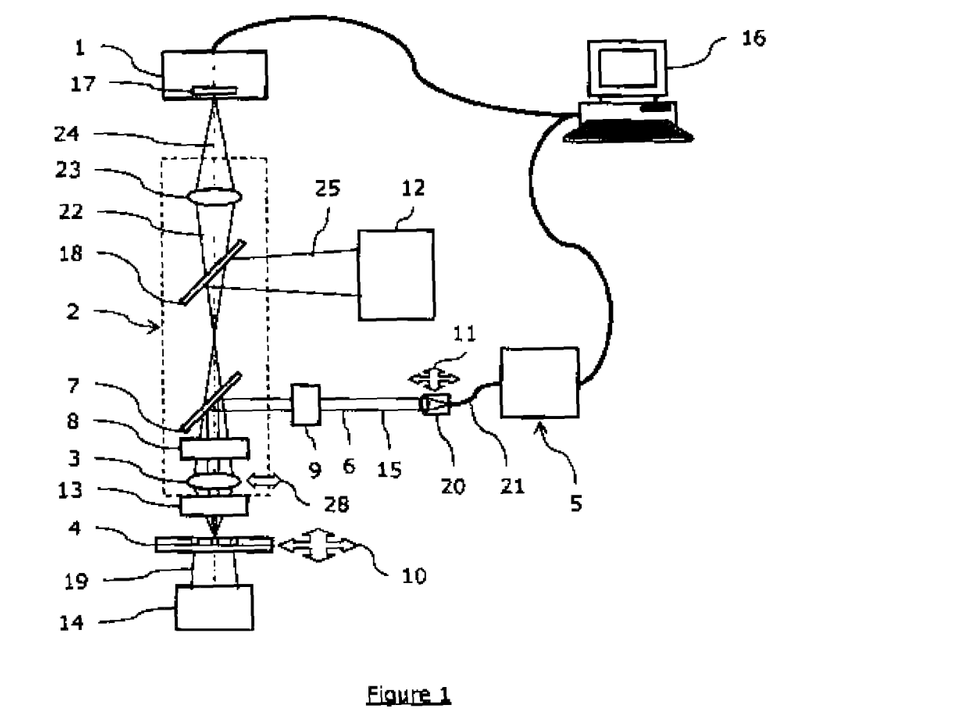
FIG. 1 illustrates an embodiment of the inspecting device according to the invention.

In reference to FIG. 1, an inspecting device according to the invention includes an imaging pathway and an interferometric measurement pathway, which are intended to provide measurements about an object to be inspected 4.

The imaging pathway includes a camera 1, equipped with a CCD type matrix sensor 17. It also includes optical imaging means 2 capable of forming an image 50 of the object 4 on the sensor 17 of the camera 1, according to a field of view substantially proportional to the magnification of the optical imaging means 2 and to the dimension of the sensor 17.

The optical imaging means 2 include, according to a conventional microscopy configuration, a distal lens 3 arranged on the object side and an optical relay or tube lens 23, through which the imaging beam 22 consisting of the light from the object 4 and projected onto the sensor 17 of the camera 1 passes. The distal lens 3 is a microscope lens optimized for visible wavelengths.

The infrared interferometric measurement pathway includes an infrared measurement beam 6 inserted in the optical imaging means 2 by coupling means 7 such that it is incident on the object 4 according to a measurement region substantially included in the field of view of the imaging pathway.

The measurement beam 6 comes from a low-coherence infrared interferometer 5 and is brought by a single mode optical fibre 21 to a collimator 20. This collimator 20 forms a substantially collimated beam 6 which is inserted in the optical imaging means 2 by a coupling means with a beam splitter plate 7, which is preferably a dichroic plate. The use of a dichroic plate, which reflects infrared radiation and transmits visible light is not essential to the operation of the device but it enables losses and parasitic reflections to be minimized both in the imaging pathway and in the interferometric measurement pathway. The beam 6, substantially collimated and deflected by the dichroic plate 7, is propagated in the optical imaging means 2 along a direction substantially parallel to their optical axis 24 to be focused onto the object by the distal lens 3. The collimator 20 and the distal lens 3 are an imaging system which images the core of the fibre 21 from which the measurement beam 6 of the object 4 comes. The measurement region covered by the measurement beam 6 on the object 4 is determined by the magnification of the imaging system 20 and 3, the diffraction and the possible effect of a slight defocusing of the measurement beam 6.

When the measurement beam 6 is incident on the object 4 along a direction substantially perpendicular to the surface of the same, within tolerance limits depending on its angular aperture at the distal lens 3, the reflections which occur on the interfaces of the object 4 are recoupled in the optical fibre 21 and processed in the interferometer 5.

The device according to the invention includes displacement means 10 which enable the field of view to be positioned at the desired place on the object 4. These displacement means include displacement means in the plane perpendicular to the optical axis 24 of the sample holder supporting the object 4, and displacement means in the direction of the optical axis 24 of the entire system with respect to the object 4.

The device according to the invention includes means for changing the magnification, so as to:
form on the camera 1 an image the field of view of which at the surface of the object 4 is adapted to the dimensions of the patterns to be inspected, and
adjust the measurement region such that it is also adapted to the dimensions of the patterns of the object 4.

The magnification is adjusted by modifying the magnification of optical elements inserted between the dichroic plate 7 and the object 4 and through which the measurement 6 and the imaging 22 beams simultaneously pass, so as to simultaneously affect the field of view and the dimension of the measurement region in substantially identical proportions.

The magnification is modified by changing the microscope lens 3, so as to obtain magnifications in the order of ×2 to ×50 mainly on the imaging pathway. Depending on the automation level being sought, the device according to the invention is equipped with a lens holder turret 28, possibly powered, which enables the microscope lens 3 to be readily changed.

By adjusting the magnification in such a way, the physical dimensions of the field of view (view on the camera 1) and of the measurement region (of the infrared metrology) are simultaneously adjusted at the surface of the object, in substantially similar proportions. In other words, with a distal lens 3 having a magnification ×20, a field twice as small as with a lens ×10 is 15 viewed on the object 4, and the size of the measurement region on the object 4 is also substantially twice as small. This also enables in a single operation the resolution of imaging and infrared metrology to be adapted to the characteristics of the object 4. It is also worthy of note that the pixel size of the measurement region as "seen" by 20 the sensor 17 of the camera 1 is substantially independent of the magnification of the distal lens 3, and therefore this measurement region can be accurately positioned using imaging at any magnifications.

The device according to the invention includes a light source 12 the emission spectrum of which includes visible wavelengths. This light source 12 includes white light emitting diodes (LED). It emits a lighting beam 25 which illuminates the object 4 such that it can be imaged by reflection. For the sake of clarity, the lighting beam 25 is not shown in FIG. 1 after the plate 18.

Figure 3:
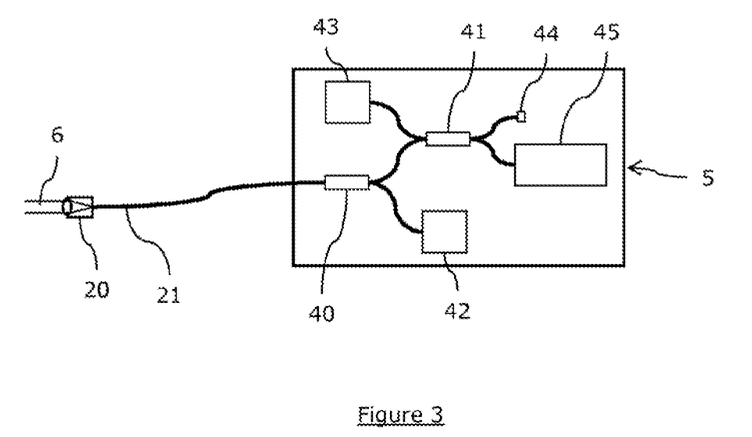
FIG. 3 illustrates an embodiment of a low-coherence infrared interferometer in an inspecting device according to the invention.

In reference to FIG. 3, the interferometer 5 is a low-coherence infrared interferometer operating in the infrared, at wavelengths for which many usual materials in microelectronics such as silicon are substantially transparent.

The interferometer 5 is intended to operate via imaging means 2 and in particular the distal lens 3 which are optimized for visible wavelengths, which are standard in microscopy. But it is known that antireflection coatings of optics optimized for visible wavelengths tend, on the contrary, to increase substantially the reflectivity of surfaces in the infrared, sometimes up to 30%, which is very severe measurement conditions for infrared interferometry. The method implemented in the interferometer 5 enables exactly to make it substantially insensitive to parasitic reflections.

This result is achieved by implementing a low-coherence infrared interferometry principle in which only reflections of the measurement beam 6 that occur in a measurement region or range encompassing interfaces of the object 4 (or at least at an optical distance equivalent to the optical distance between the collimator 20 and the object 4 along the beam 6) can cause usable interferences.

The core of the interferometer 5 is a single mode optical fibre based Michelson dual interferometer. It is illuminated by a fibred light source 42 which is a superluminescent diode (SLD) the centre wavelength of which is in the order of 1300 nm to 1350 nm and the spectral width of which is in the order of 60 nm. The choice of this wavelength corresponds in particular to component availability criteria.

The light from the source is directed through the coupler 40 and the fibre 21 to the collimator 20, to make the measurement beam 6. Part of the beam is reflected in the fibre 21 at the collimator 20, to make the reference wave.

Retroreflections coming from the object 4 are coupled in the fibre 21 and directed with the reference wave to the decoding interferometer constructed around the fibre coupler 41. This decoding interferometer has a function of an optical correlator both arms of which comprise respectively a fixed reference 44 and a time delay line 45. Signals reflected at the reference 44 and the delay line 45 are combined, through the coupler 41, on a detector 43 which is a photodiode. The function of the delay line 45 is to introduce an 30 optical delay between incident and reflected waves, which is variable over time in a known manner, obtained for example by moving a mirror.

The length of the arms with reference 44 and delay line 45 of the decoding interferometer 41 is adjusted so as to enable with the delay line 45 the differences in optical paths between the reference wave reflected at the collimator 20 and the retroreflections from the object 4 to be reproduced, in which case at the detector 43, an interference peak is obtained the shape and width of which depend on spectral characteristics of the source 42 (the wider the spectrum of the source 42, the narrower the interference peak).

Thus, the measurement range is determined by the difference in 5 optical length between the arms with reference 44 and delay line 45 of the decoding interferometer 41, and by the maximum stroke of the delay line 45. Moreover, as the reference wave is generated at the collimator 20 outside the imaging system 2, parasitic reflections in the optical systems do not contribute significantly to interferences.

Figure 4:
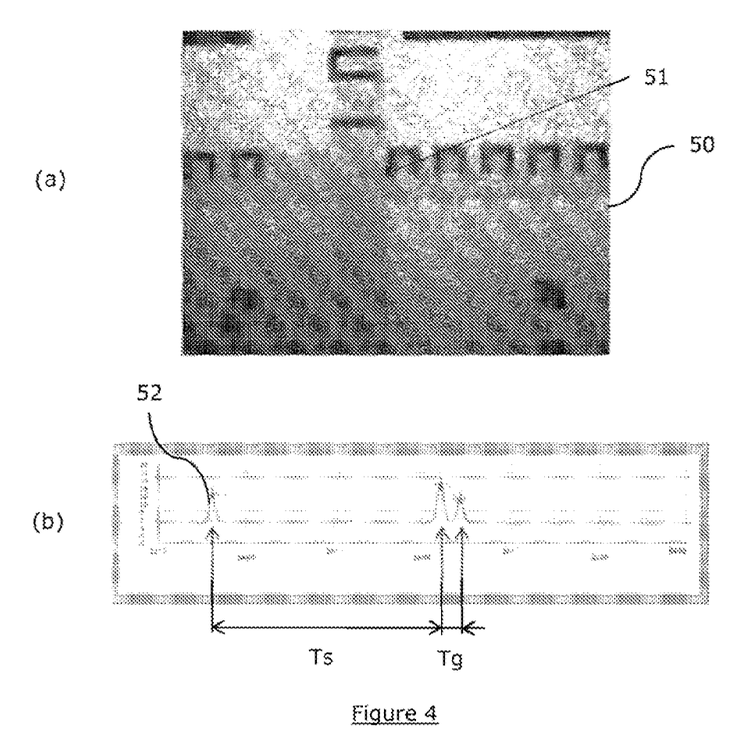
Figure 5:
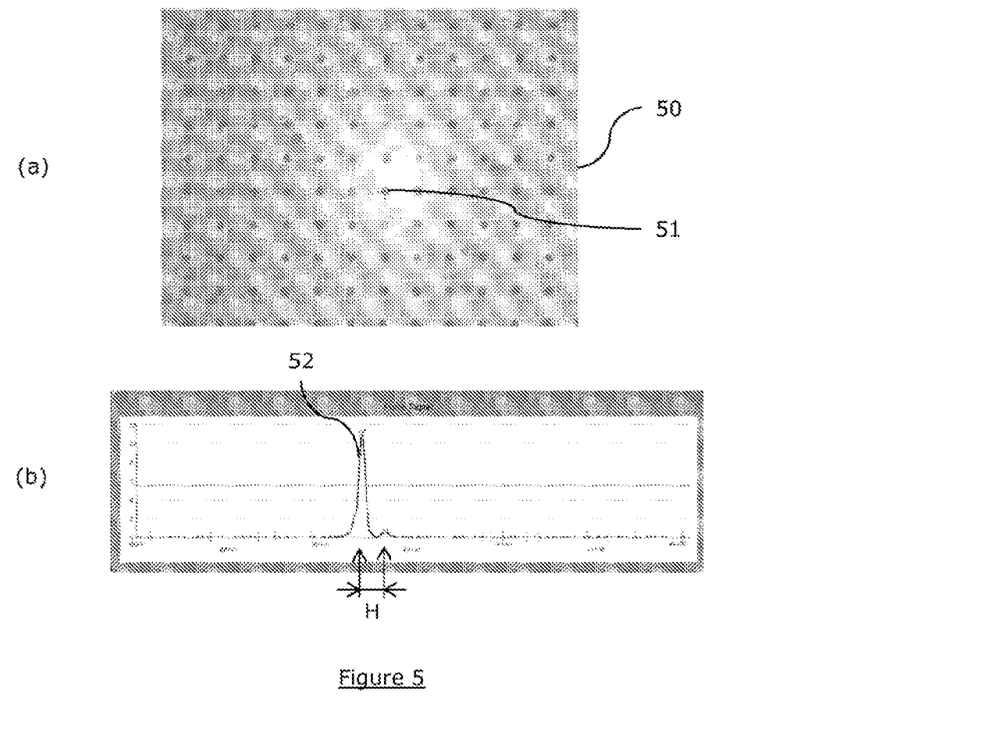

FIGS. 4 and 5 show exemplary measurements illustrating the operation of the device, after acquisition and processing on a computer 16. Point measurements are performed with the infrared interferometer at specific points of the surface of the object 4, at positions 51 viewed on the images 50 of the same, so as to produce a representation of the object 4.

FIG. 4 shows an exemplary thickness measurement. FIG. 4b shows an interferometric signal 52 obtained with the interferometer 5, which corresponds to a thickness measurement of a silicon layer Ts followed by an air space Tg. Each interface met by the measurement beam 6 and giving rise to a retroreflection produces an interference peak. Distances between peaks correspond to the optical thickness of the layer, which is to be divided by the reflective index to yield the effective thickness. FIG. 4a shows the image 50 of the surface of the object 4 with the location 51 of the measurement place.

FIG. 5 shows an exemplary pattern height measurement obtained with the interferometer 5 as implemented according to the method described in FR 2 892 188, by division of wave fronts. The measured patterns are holes. FIG. 5b shows an interferometric signal 52 obtained with the interferometer 5, for measuring the height H of a hole. The hole surface and bottom each reflect a fraction of the wave front of the incident measurement beam 6, thus producing an interference peak. The distance between the peaks correspond to the height H of the hole. FIG. 5a shows the image 50 of the surface of the object 4 with the location 51 of the measurement place.

Given that in the delay line 45, the differences in optical paths are reproduced between the reference wave generated in the collimator 6 and the reflections from the object 4, the interferometer 5 can be used to measure absolute distances or altitudes on the object. Indeed, the position of the interference peaks in the measurement range depends on the optical distance between the corresponding interface of the object 4 and the collimator 20 along the path traveled by the measurement beam 6. It is thus possible to measure heights of patterns or other relief elements, or a topology, by moving the object 4 relative to the imaging system 2 and by noting the evolution in the position of the interference peaks in the measurement range.

The location of the measurement region in the image 50 is performed by a prior calibration operation of the device, such that the viewed image can be superimposed with a mark corresponding to the position of this measurement region. This mark is visible at the position 51 in the image 50 of FIG. 5a. The calibration can be performed for example by arranging instead of the object an infrared viewing map which enables the infrared measurement beam 6 to be seen on the camera.

According to an embodiment, a light beam 15 with wavelengths detectable by the camera 1 is superimposed with the measurement beam 6. This superimposition can be for example performed by means of a fibre coupler inserted at the interferometer 5 ahead of the collimator 20. This viewing beam 15 substantially travels the same path as the measurement beam 6 in the imaging system 2 and produces on the surface of the object 4 a spot detectable by the camera 1, visible for example in FIG. 5a. It is thus possible to directly view the position of the measurement region on the image 50 without prior calibration.

Figure 2:
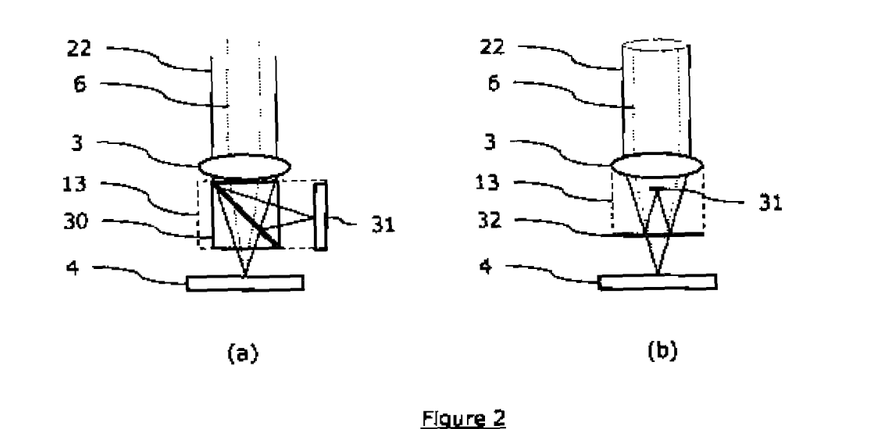
FIG. 2 illustrates embodiments of full field interferometers in an inspecting device according to the invention, according to the so-called Michelson configuration, FIG. 2a, and the so-called Mirau configuration, FIG. 2b.

Referring to FIG. 2, according to an embodiment, the device according to the invention further includes a full field interferometer 13, inserted at the distal lens 3. This full field interferometer 13 enables the imaging device to be transformed into an optical profilometer, capable of producing an altitude mapping or a three-dimensional representation of the surface of the object 4. The altitude of the surface is obtained according to well-known methods, by superimposing with light reflected by the object 4 on the CCD sensor 17 of the camera 1, a reference wave from the same light source 12 and that has substantially traveled the same optical distance to the sensor 17 as said light reflected by the object 4. This reference wave is generated by a reference mirror 31 located in one of the arms of the interferometer 13. It produces on the sensor 17 interference fringes the shape of which depends on the difference in shape between the reference mirror 31 and the surface of the object 4. By conducting a measurement sequence wherein, for example, the relative length of the arms of the interferometer 13 is varied in a predetermined manner, by moving the object 4 or the distal lens 3 and interferometer 13 assembly, a plurality of interference figures are obtained which enable the three-dimensional shape of the surface to be calculated with high accuracy.

Different kinds of interferometers 13 are usable, depending in particular on the magnification and the working distance of the distal lenses 3. Among representative examples, there are:

- the Michelson configuration, shown in FIG. 2a, according to which a beam splitter cube 30 (or a beam splitter plate) is inserted beneath the distal lens 3, and returns a fraction of the incident lighting beam 25 back to a reference mirror 31;
- the Linnik configuration, which is an alternative to the Michelson configuration and which includes a distal lens 3 in each arm of the interferometer 13;
- the Mirau configuration, shown in FIG. 2b, according to which a semi-reflective plate 32 returns a fraction of the incident lighting beam 25 back to a reference mirror 31 inserted in the centre of this beam 25.

For the sake of clarity, the lighting beam 25 is not shown in FIGS. 2a and 2b. Only the imaging beams 22 from reflections on the mirror 31 and the object 4 are represented.

To integrate the interferometer 5 in the profilometer, it is preferable to restrict the reflection of the measurement beam 6 on the reference mirror 31. This condition is not indispensable but enables the presence of a high intensity parasitic peak to be avoided in measurements. This result is achieved by using a splitter 30 or dichroic 32 element substantially transparent to the wavelengths of the measurement beam 6, and which exhibits the desired reflectivity (for example in the order of 50%) to the wavelengths of the imaging system. It is also possible to implement a dichroic reference mirror 31, which does not or hardly reflects the wavelengths of the measurement beam 6.

A device according to the invention integrating an infrared interferometer and an optical profilometer enables a three-dimensional model of an object 4 to be built by combining all the measurements in a single representation. This device is particularly effective to control narrow and deep etchings such as holes shown in FIG. 5a. Indeed, because of the numerical aperture of the imaging beam 22 (that is the half ratio of its width at the distal lens 3 to the distance from the distal lens 3 to the focusing point), the optical profilometry can not access the bottom of the holes to 10 measure the depth thereof. This measurement is on the other hand accessible to the infrared interferometer 5 as illustrated in FIG. 5. The combination of measurements thus enables a more complete three-dimensional representation of the surface to be obtained, including regions which are not accessible to the profilometer.

According to an embodiment, the device according to the invention includes a light source 14 which emits a beam 19 enabling the object 4 to be lighted by going through. This embodiment enables imaging in transmission of the object 4 to be made. For the sake of clarity, the lighting beam 19 is not shown in FIG. 1 beyond the object 4.

For applications in microelectronics particularly, the light source 14 is designed so as to exhibit an emission spectrum extending in the near infrared to wavelengths higher than 1 micrometer, for which silicon is no longer wholly opaque. This light source 14 can be 25 a halogen lamp. It is then possible, even with a camera 1 the CCD sensor 17 of which is silicon based, to obtain an image by looking through enabling for example elements of circuits to be located on a wafer 4 to perform with the infrared interferometer 5, measurements at accurate places through the back face of the wafer opposite etched elements.

According to particular embodiments, it is possible to implement in a device according to the invention, a light source 14 with an emission spectrum extending in the near infrared (wavelengths between about 780 to 1100 nm) and/or near ultraviolet (wavelengths between about 780 to 1100 nm), and to carry out imaging par reflection of the object 4 at one or more of these wavelengths of the source 14. It is also possible to implement a full field interferometer 13 with such a source 14.

According to particular embodiments, the camera 1 can include any device capable of carrying images of an object 4, such as for example:

- a CMOS type matrix sensor 17,
- point or line sensors associated with scanning means enabling all the points of the field of view to be covered,
- point or line sensors, possibly associated with scanning means enabling measurements to be acquired as lines.

According to particular embodiments:

- the beam splitter plates 7 and 18 can be replaced by any means for separating beams, such as beam splitter cubes, polarized components, etc.;
- the collimator 20 can include displacement means 11 which enable the position of the measurement beam 6 to be moved, and thus the position of the measurement region to be moved on the object relative to the field of view covered by the imaging means 2;
- the device can include second magnification means 9 for modifying the magnification of the measurement beam 6, so as to modify the dimension of the measurement region relative to the field of view;
- the device can include an additional optics 8 having a variable magnification, through which the measurement 6 and imaging 22 beams simultaneously pass, and which enables the field of view and the dimension of the measurement region to be simultaneously modified at the surface of the object under substantially identical proportions. The magnification of such additional optics 8 can be continuously adjusted by moving optical elements, or discretely by replacing optical elements;
- the optical relay 23 can include a variable magnification optics, which enables the field of view and the size of the measurement region to be varied on the camera 1. The magnification can be continuously adjusted by moving optical elements, or discretely by replacing optical elements;
- the light source 12 can include a halogen source;
- the light source 12 can include any light source having spectral contents detectable by the camera 1;
- the interferometer 5 can be implemented at any infrared wavelengths, in particular between 1100 nm and 1700 nm, and in particular around 1550 nm. The source 42 can be any type of source or combination of infrared sources, producing a plurality of wavelengths according to a continuous or discontinuous spectrum;
- the interferometer 5 can include any types of low-coherence interferometers. This can be a single Michelson interferometer with a delay line in either arm. Optical delays can be decoded in the frequency domain by spectral analysis techniques;
- the interferometer 5 can be partly or wholly made with free propagation optics. The interferometer 5 can also be partly or wholly made with integrated optics, in particular based on planar wave guides.

Of course, the invention is not limited to the examples just described and many alterations can be made to these examples without departing from the scope of the invention.

The invention claimed is:

1. A microscope device for inspecting structured objects comprising:
   a camera;
   a distal lens capable of producing, on the camera, an image of the object according to a field of view;
   lighting means, producing a lighting beam with visible wavelengths, arranged in such a way as to illuminate the object through the distal lens;
   a low-coherence infrared interferometer, comprising a measurement beam with a plurality of infrared wavelengths, capable of producing measurements by means of interferences between retroreflections of said measurement beam and at least one separate optical reference;
   a collimator and optical coupling means for injecting the measurement beam issued from an optical fiber of the interferometer into the distal lens in such a way that it passes through the distal lens, and that it intercepts said object according to a measurement region substantially included in the field of view of the distal lens;
   wherein:
   the optical fiber and collimator are arranged so that part of the measurement beam is reflected in the optical fiber at the collimator to generate the optical reference; and
   the low-coherence infrared interferometer comprises a decoding interferometer having an arm with a fixed reference and an arm with a time delay line, the difference in optical length between said arms and the maximum stroke of the delay line being adjusted in such a way that only the measurement beam retroreflections that occur in a measurement range encompassing interfaces of the object produce usable interferences with the optical reference, and parasitic reflections in the distal lens do not contribute significantly to said interferences.

2. The device according to claim 1, wherein the distal lens is designed to produce images at visible wavelengths.

3. The device according to claim 1, wherein the distal lens is a microscope lens.

4. The device according to claim 1, wherein the measurement beam includes wavelengths between 1100 and 1700 nanometers.

5. The device according to claim 1, further comprising first magnifying means for changing the magnification of the optical images means so as to simultaneously modify the field of view and the dimension of the measurement region in substantially identical proportions.

6. The device according to claim 5, wherein said first magnifying means include at least one element from a turret equipped with optics having different magnifications, and a variable magnification optics.

7. The device according to claim 5, further comprising second magnifying means for modifying the magnification of the measurement beam, so as to modify the dimension of the measurement region relative to the field of view.

8. The device according to claim 1, further comprising relative displacement means of the object and the distal lens.

9. The device according to claim 1, further comprising relative displacement means of the object and the measurement beam.

10. The device according to claim 1, further comprising, at the distal lens, a full field interferometer capable of producing on the camera, interference fringes superimposed with the image of the object, so as to deduce therefrom a topography of the surface of the object.

11. The device according to claim 10, wherein the full field interferometer includes a dichroic element substantially transparent to the wavelengths of the measurement beam.

12. The device according to claim 1, further comprising lighting means arranged opposite the object with respect to the distal lens, including a light source with wavelengths higher than one micrometer, and enabling an image in transmission of the object to be made on the camera.

13. The device according to claim 1, wherein the low-coherence infrared interferometer allows to measure in the measurement range, at least one of the following elements:
   the optical thickness of at least one layer of material substantially transparent to wavelengths of the measurement beam,
   the height of patterns at least a high part of which and at least a low part of which are included in the measurement region,
   the absolute height, in the measurement range, of points of contact between the measurement beam and the object.

14. The device according to claim 1, further comprising a viewing beam superimposed with the measurement beam, which viewing beam includes at least one wavelength detectable by the camera.

15. The device according to claim 1, further comprising digital processing and displaying means, capable of producing an image of the field of view including a display of the measurement region.

16. A method for inspecting structured objects, comprising:
   producing, on a camera, an image of the object according to a field of view, implementing a distal lens arranged on the side of the object;
   producing a lighting beam with visible wavelengths using lighting means, wherein the lighting beam is arranged in such a way as to illuminate the object through the distal lens;
   producing measurements by interferences between retroreflections of a measurement beam and at least one optical reference, from a low-coherence infrared interferometer emitting this measurement beam with a plurality of infrared wavelengths, wherein the low-coherence interferometer comprises a decoding interferometer having an arm with a fixed reference and an arm with a time delay line;
   providing an optical coupling for inserting the measurement beam issued form an optical fiber of the interferometer and a collimator into the distal lens in such a way that it passes through the distal lens and that it intercepts said object according to a measurement region substantially included in the field of view of the distal lens;
   generating the optical reference by reflecting part of the measurement beam in the optical fiber at the collimator; and
   adjusting the difference in optical length between said arms and the maximum stroke of the delay line in the low-coherence infrared interferometer in such a way that only the measurement beam retroreflections that occur in a measurement range encompassing interfaces of the object produce usable interferences with the optical reference and parasitic reflections in the distal lens do not contribute significantly to said interferences.

17. The method according to claim 16, wherein the location of the measurement region in the image of the field of view is stored during a prior calibration.

18. The method according to claim 16, further including:
   combining the information from the camera and the low-coherence infrared interferometer to produce a three-dimensional representation of the object.

* * * * *